_3,432,309_
**METHOD FOR PREPARING PRECOOKED
RICE FLOUR**
Lawrence Lynn and Roy M. Anderson, Houston, Tex.,
assignors to Riviana Foods Inc., a corporation of
Delaware
No Drawing. Filed Jan. 22, 1965, Ser. No. 427,486
U.S. Cl. 99—93                                       7 Claims
Int. Cl. A21d 6/00

ABSTRACT OF THE DISCLOSURE

Preparation of gelatinized precooked rice flour by cooking whole or broken grain rice sufficiently to gelatinize the starch content thereof in an excess of water; washing to stop the cooking process and to remove loose starch therefrom, drying said rice and grinding the cooked, dried rice.

---

This invention relates to precoked rice flour and the method by which it is prepared.

The preparation of conventional precooked cereal grain flour involves cooking of the various cereal grain flours in an excess of water until the starch therein has been substantially or completely gelatinized, after which the cooked mixtures are subjected to drying processes, such as heating the cooked mixture on single or double drum dryers to reduce the moisture content to about nine to thirteen percent. Thereafter the resulting dry material must be reground to typical flour granular size. Such procedure is relatively expensive since it involves two grinding steps and rehydration of the resulting product, in the case of rice flour, results in a pasty or sticky product. In many possible uses of the precooked rice flour, for example as an additive to chopped meat products, bread and pastry doughs and the like, the tendency to form a sticky or smeary mixture with other ingredients creates a serious mixing and handling problem which limits and restricts the use of such conventional precooked rice flour in many potential applications.

It is, accordingly, an object of this invention to produce an improved precooked rice flour from whole or broken rice grains by an economical process.

It is a discovery of this invention that a unique precooked rice fluor may be produced which processes improved mixing and blending properties when used with other ingredients.

It is our further discovery that the product of our invention possesses improved physical and chemical properties in the formation of a relatively non-sticky rice flour upon rehydration.

It is our still further discovery that the product of our invention possesses improved physical and chemical properties in the formation of relatively low viscosity slurries when mixed with an excess of water over that required for rehydration.

Additional objects and advantages will be apparent in the description of a process and product which follows and in the processes, steps and compositions which are particularly pointed out in the appended claims.

The present invention involves cooking whole or broken kernels of milled white rice, brown rice, or parboiled rice in an excess of water until the rice particles are gelatinized to any desired degree, but we presently prefer to substantially or completely gelatinize the rice particles as measured by loss of birefringence or by organoleptic means. During the cooking step, we have found that an excess of water over the amount necessary for the gelatinization of the rice may be used to remove a portion of the amylose fraction of the starch in the rice grain. The amylose fraction of the starch is more soluble than the amylopectin fraction, and after a portion of the amylose content of the rice has been solubilized it may be washed or rinsed away from the remaining discrete kernels or particles. We have found that the amylose-amylopectin ratio may be varied to some extent by varying the amount of excess water used during cooking and to a greater extent by the amount of washing conduced subsequent to the cooking step.

After the cooked rice kernels or particles have been washed to the desired degree, they are then rapidly dried to a moisture content below about 14% and preferably to a range between 6 and 12%. The cooked and dried rice particles are then subjected to conventional grinding or milling processes to produce a granular size which may be varied as desired from very coarse, for example, a size passing through a U.S. No. 8 standard sieve, to very fine, for example, a size passing through a U.S. No. 140 standard sieve. We presently prefer, however, a range of particle sizes from a size small enough to pass through a U.S. No. 30 standard sieve to a size large enough to be retained upon a U.S. No. 140 standard sieve.

The method of this invention may be used to create a precoked rice flour from any of three common basic types of rice, i.e. raw milled polished rice or white rice, brown rice, or parboiled rice. Raw milled or white rice is rice from which the husk and bran coating both have been removed. Brown rice is rice from which the husk has been removed but in which the bran outer coating remains substantially intact. Parboiled rice is created by soaking rough rice paddy (unhulled rice substantially as it comes from the field) in cold, warm or hot water for a substantial period of time, until the rice grains have increased their moisture content, generally to at least above 20%; draining the rice; and then steaming the rice, generally at super atmospheric pressure, for from 5 to 20 minutes.

In one preferred embodiment of this invention, the process may successfully employ as raw material rice of long, medium or short grain at its normal moisture content of 10 to 14%. The rice may be milled white or brown. The conditions illustrated hereinafter are for the processing of milled white rice, but it will be apparent to those skilled in the art that the sequence taught, with appropriate modifications and operating conditions will be applicable also to brown rice, or to parboiled rice of long, medium or short grain class at its normal moisture content of 10 to 14%.

The rice is preferably cooked by immersion cooking or by a combination of immersion cooking and steaming. Any suitable cooking means may be employed; however, during at least a part of the cooking, an excess of water should be provided over that required for gelatinization. We presently prefer to use a large excess of water, amounting to at least double the amount required for gelatinization, and in practice, a great deal more water is used. The weight of water required for gelatinization of rice varies generally from an amount as low as about double the weight of the rice being cooked to as high as about four times the weight of the rice being cooked. The duration of the total cooking time for raw rice is from about 9 to 18 minutes at about 195 to 210° F. and for parboiled rice is from about 18 to 29 minutes at about 195 to 210° F. and preferably about 23 minutes. If a two step cooking procedure is employed for raw rice, the immersion cooking should be between 9 to 13 minutes at 195 to 210° F. and the steaming should be for a period of up to about four minutes and preferably from about 0.5 to 3.5 minutes at pressures from 0 to 5 p.s.i.g. At the end of the cooking, by whatever means may be employed, gelatinization will be substantially complete. Upon completion of cooking the gelatinization reaction should be abruptly terminated by a water quench. An abundance of cold water is normally used to provide both a rapid quench and washing to remove loose starch from the rice grains or particles.

As previously mentioned, at the completion of the immersion cooking a steaming step may be advantageously included to cook the rice for a very short period of atmospheric steaming or steaming at a low pressure, from 0 to 5 p.s.i.g., for a period of up to about 4 minutes preferably from 0.5 to 3.5 minutes in duration for raw rice; and from 1 to 5 minutes, preferably 2 to 4 minutes, for parboiled rice, with or without an intermediate cold water washing step before such steaming. In order to obtain the advantage of thorough removal of loose starch we presently prefer to employ an intermediate cold water washing and quenching step if such steaming step is employed. The steaming step is not necessary but it is advantageous as a means of completing the gelatinization of the rice with little or no increase in moisture content and with a minimum rupture of starch cells.

It has been found that good yields of high quality precooked rice flour can be produced from the use of distilled water or regular clean water adjusted to a pH of about 4.5 to 6.5 in the cooking and washing steps. Such an adjustment of the pH is desirable to avoid high production losses since a higher pH tends to increase the solubility of the starch and a lower pH tends to digest the starch. After the rice has been cooked and washed, it should be dried by either a batch or continuous procedure, the moisture being most effectively removed by a stream of heated air or stream of heated inert gas such as nitrogen. A single temperature and air velocity may be used for a suitable time; or a drying sequence of two or more phases may be used. As is well known in the art, the time-temperature relationship during initial drying is a prime determinate of the amount of expansion or porosity which is retained in the final product by presetting the grain size.

In our presently preferred drying process, the partially dried rice kernels, or broken grains, are dried using heated air and a bed temperature from 230 to 270° F. for raw rice; and preferably from 240 to 300° F. for parboiled rice, for a residence time of from 9 to 20 minutes as necessary to obtain the desired final moisture content. By employing this procedure the rice should be dried to a final moisture level of below 14% and preferably from 6 to 12%.

After the cooked and washed rice particles have been dried to the desired moisture content the particles are then subjected to conventional grinding or milling processes to produce the desired granular size which can be varied from very coarse (for example, passing through a U.S. No. 8 standard sieve) to very fine (for example, passing through a U.S. No. 140 standard sieve) depending upon the application for which the product is to be used. The bulk density of the product varies from about 0.40 gm./cc. to about 0.80 gm./cc. and it has the capacity at 25° C. to absorb water in quantities of at least about 4 times its dry weight.

The following examples further illustrate the objects and advantages of my invention. It should be understood these examples relate to the treatment of specific rice samples and the data, conditions and methods of treatment are not to be construed as to unduly limit this invention, these examples being set forth merely for illustrative purposes.

Example 1

Eight pounds of well-milled medium grained white rice, Nato variety, was placed in a wire mesh basket and immersed in a large excess of water, amounting to about 300 pounds of water in a covered vessel. The water was adjusted to a pH of 5.0 with food grade hydrochloric acid and maintained at about 205–210° F. The rice was cooked for 10½ minutes under constant agitation and under an atmosphere of saturated steam at atmospheric pressure. At the end of the 10½ minute cooking period the water was drained out of the vessel and the rice rinsed with cool water to remove residual loose starch and to cool the rice to stop the cooking action. Then the rice was again placed in the vessel, the lid closed, and saturated steam at atmospheric pressure was introduced into the vessel for 4 minutes to further the cooking action without excessive moisture gain and to thereby minimize rupturing of the starch cells. After the steaming process, the rice was immediately rinsed with cool water to stop the cooking action and the rice was further washed by gentle agitation in a large excess of water, about 300 pounds, to remove the residual loose starch.

After washing, the rice was spread evenly on a wire mesh tray and dried in hot air at 250° F. for 15 minutes alternately using upward and then downward air flow. The rice had a foisture content of about 73% at the start of drying and a moisture content of 8% at the conclusion of the drying step.

The resultant cooked and dried rice was then ground in a hammer mill to a granular size typical of commercial ground flour. The product was white, free-flowing and had a bulk density of 0.75 gm./cc. The distribution of particle sizes in this product is indicated as follows:

25% passed through a U.S. No. 140 standard sieve
45% passed through a U.S. No. 100 standard sieve
70% passed through a U.S. No. 70 standard sieve
100% passed through a U.S. No. 50 standard sieve The amylose content of the starting raw material was 14 to 16% and this was reduced by the foregoing process to between 5 and 8%.

The precooked rice flour of the above described process absorbs 4 to 5 times its original weight in 25° C. water and a 10% slurry in 25° C. water has a viscosity of between 400 and 500 centipoise.

Example 2

Eight pounds of well-milled long grain white rice containing substantially 90% of broken kernels (less than 75% of the whole kernel in length), Bluebonnet variety, was processed as described in Example 1. The resulting product was white, free-flowing, and had a bulk density of .77 gm./cc.

The amylose content of the starting raw material was 22–24% and was reduced by the process to between 12 and 14%. The product absorbs between 4 and 5 times its original weight in 25° C. water and a 10% solution in 25° C. water has a viscosity of 200 centipoise.

As a means of comparing the product of this invention with precooked rice flour from a conventional process, a 10% slurry of regular long grain rice flour in water was cooked for 10 minutes at 210–212° F. and then spread thinly, 1/16 to 1/8 inch, on a wire mesh tray and air dried at 250° F. for two hours. The product was then scraped from the tray and conventionally ground in a hammer mill. Comparative viscosities of the two products are shown below for two different graded particle sizes.

| Granular size | Product from new process | Control product from conventional process |
| --- | --- | --- |
| Passing U.S. No. 30 and retained on U.S. No. 70. | 50 cps. at 25° C., 10% slurry. | 100 cps. at 25° C., 10% slurry. |
| Passing U.S. No. 70 and retained on U.S. No. 140. | 200 cps. at 25° C., 10% slurry. | 800 cps. at 25° C., 10% slurry. |

The new precooked rice flour was characterized by the avoidance of starchy material from ruptured starch cells, a relative abundance of which appeared in the control product, yet the new product had the same degree of water absorption and retention, which was found to be 4–5 times its own weight at 25° C. The lower content of amylose, which is the linear polymer of the rice starch factors and the relatively high content of amylopectin, a branch chain polymer, would lead to an anticipation of a higher viscosity for the new product, yet the viscosity was much less than that of the control, apparently because of the avoidance of starchy effluent from ruptured starch cells. The control product, as expected, had no change in the amylose-amylopectin ratio over the raw material.

A further characteristic of the new product may be noted from the above data in which a change in granular size from the first graded granular size to the second, relatively smaller granular size resulted in an increase in viscosity from 50 centipoise to 200 centipoise in the product of this invention, whereas the same decrease in particle size in the control product increased the viscosity from 100 centipoise to 800 centipoise. Thus, not only is the viscosity of slurries made from the product from the process of this invention lower than the viscosity of comparable conventional precooked rice flour, amounting to 25-50% of the viscosity of the control in the above examples, but also the relative change in viscosity with particle sizes of slurries produced from the two types of product is significant. With the same change in particle size, the product from this invention had only a fourfold increase in viscosity compared with an eightfold increase in the viscosity of comparable slurries for the same particle sizes of the conventional precooked rice flour.

It has been found that the new product forms a non-sticky rehydrated product and when an excess of moisture over that required for rehydration is used, a low viscosity slurry is formed. Thus, the product of this invention is easily handled in the course of absorption of water, aqueous materials or other materials, while the control cooked flour shows a high degree of stickiness and pastiness, leading to much more difficulty in handling in mechanical equipment, as for example, in meat product forming, meat balls, sandwich spreads, and dough processing for which the product of this invention has particular utility.

Various modifications and alterations of this invention will be apparent to those skilled in the art from the foregoing discussion, and the subject invention should be deemed to include all such modifications and alterations as fall within the spirit and scope of the following claims.

We claim:

1. A process of preparing a precooked rice flour from whole or broken grain rice comprising cooking said rice in an excess amount of water over that required for gelatinization and for a period of time sufficient to gelatinize the starch content thereof, washing said rice to stop the cooking process and to remove loose starch from said whole or broken grain rice so that a major portion of the remaining starch is retained in unbroken starch cells, drying said rice to a moisture content below 14%, and grinding the cooked, dried rice.

2. A process of preparing a precooked rice flour from whole or broken grain rice comprising cooking said rice in an excess amount of water over that required for gelatinization and for a period of time sufficient to gelatinize the starch content thereof, washing said rice to stop the cooking process and to remove loose starch from said whole or broken grain rice so that a major portion of the remaining starch is retained in unbroken starch cells, drying said rice to a moisture content between 6 and 12%, and grinding the cooked, dried rice to a particle size at least small enough to pass a U.S. No. 8 standard sieve.

3. The process of claim 1 in which the cooked rice is dried rapidly to a total moisture content below 14 percent by circulating heated air at a temperature above 230° F. through the bed of rice for about 10 to 20 minutes.

4. The process of claim 1 in which said cooked, dried rice is ground to a particle size small enough for said rice flour to pass through a U.S. No. 8 standard sieve.

5. The process of claim 1 in which said cooked, dried rice is ground to a particle size ranging from particles small enough to pass through a U.S. No. 30 standard sieve to particles large enough to be retained upon a U.S. No. 140 standard sieve.

6. A process of preparing a precooked rice flour from whole or broken grain rice comprising immersing said rice in an excess of water at over the amount required for gelatinization at 195 to 210° F. for 9 to 13 minutes, steaming said rice for a period of from 0.5 to 3.5 minutes at pressures of below 5 lbs. p.s.i.g., washing said rice to remove loose starch, drying said rice to a moisture content below 14%, and grinding the cooked, dried rice.

7. The process of claim 6 and further including washing said rice to remove loose starch after immersing said rice in water at 195 to 210° F. and before said steaming step.

References Cited

UNITED STATES PATENTS

| 1,011,730 | 12/1911 | Braunbeck | 99—93 |
| 1,073,985 | 9/1913 | Herendeen | 99—93 |
| 1,136,501 | 4/1915 | Andrews | 99—93 |
| 1,187,703 | 6/1916 | Boss | 99—93 |
| 2,358,827 | 9/1944 | Rakowsky et al. | 99—93 |

FOREIGN PATENTS 644,621  7/1962  Canada.

RAYMOND N. JONES, *Primary Examiner.*